United States Patent [19]

Fischer

[11] 3,983,310

[45] Sept. 28, 1976

[54] CONNECTION BETWEEN A SOCKET AND A LIQUID COOLED CABLE

[75] Inventor: Horst Fischer, Osnabruck, Germany

[73] Assignee: Kabel-und Metallwerke Gutehoffnungshutte Aktiengesellschaft, Hannover, Germany

[22] Filed: Apr. 21, 1975

[21] Appl. No.: 569,929

[52] U.S. Cl. .............................. 174/19; 174/15 WF; 174/21 JR

[51] Int. Cl.$^2$ ...................... H02G 15/22; H01B 7/34

[58] Field of Search ............... 174/19, 21 JR, 21 JC, 174/21 R, 15 WF, 15 C

[56] References Cited

UNITED STATES PATENTS

| | | | |
|---|---|---|---|
| 2,175,749 | 10/1939 | Eckman | 174/19 |
| 2,449,138 | 9/1948 | Phillips | 174/21 JC |
| 2,969,415 | 1/1961 | Hartill et al. | 174/19 |
| 3,808,350 | 4/1974 | Kluge | 174/15 WF |

*Primary Examiner*—Arthur T. Grimley
*Attorney, Agent, or Firm*—Ralf H. Siegemund

[57] ABSTRACT

A sleeve member is rotatably mounted on a socket sleeve, and the outer tube or hose of a liquid cooled cable is strapped to the sleeve member. The socket sleeve and the sleeve member are sealed and additionally the sleeve member is bolted to a split flange for retention of the sleeve member on the socket sleeve.

9 Claims, 2 Drawing Figures

CONNECTION BETWEEN A SOCKET AND A LIQUID COOLED CABLE

BACKGROUND OF THE INVENTION

The present invention relates to the connection of a liquid cooled cable for heavy currents to a socket. Such a cable is to be used, for example, for feeding electric current to an arc furnace. More particularly the invention relates to improvements in the connection of a socket to a cable which includes an inner tube as conduit for the cooling liquid, stranded conductors on that inner tube, and an enveloping outer tube or hose. The socket serves as current lead in as well as fluid connector for the cable.

Electric arc furnaces are used, for example, for smelting steel scrap, sponge iron, reduced pig iron, or the like. The furnace is powered from a transformer, and cables connect the latter to the former. These cables conduct very heavy current and must be cooled accordingly. It should be noted that heat is not only developed by the current itself, but the inherent vicinity of the furnace establishes additionally rather hot ambient conditions. Additionally, the cable may for one reason or another experience sudden tension load, but the connection must not be broken. Also, the cable should withstand (thermal) peak loads resulting, for example, from interruption in the flow of the coolant.

Another aspect to be considered is the following. The cable interconnecting a transformer with a furnace usually leads to the top part of the furnace. The space around this equipment is often very limited. Thus, as the furnace cover is lifted for any reason, e.g. for charging of the furnace, the cable may experience rather violent twisting. The same may happen for any two objects, which are interconnected by cable and which change mutual orientation for any reason. It was found that liquid cooled cable will readily be damaged by such action.

DESCRIPTION OF THE INVENTION

It is an object of the present invention to improve socket-to-cable connection of the type outlined above and to provide particularly for improvement, which will extend the life of such a liquid cooled cable when, for example, used under conditions as outlined above.

In accordance with the preferred embodiment of the invention, it is suggested to pivotally fasten the outer tube or hose of a liquid cooled cable to the socket into which inner tube and conductors have been inserted. This way any twisting of the outer hose or tube is prevented; it will not be damaged, even when the objects which the cable interconnect, are relatively displaced under conditions tending to twist the cable.

In the preferred form, one will use a sleeve member and journal it on the socket sleeve, e.g. by means of slide, roller, ball or other bearings. The outer hose or tube of the cable is strapped to that rotatable sleeve.

The sleeve member is constructed for axial slip on, onto the socket sleeve and is retained thereon, preferably by a split or two part flange, engaging the socket body and constructed further for sealing the sleeve member against the socket, so as to prevent escape of coolant fluid from the interior of the outer hose or tube of the cable.

DESCRIPTION OF THE DRAWING

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 2:
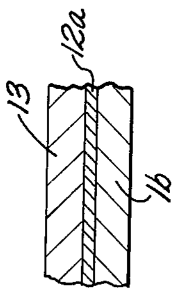
FIG. 1 is a cross-section through a cable end socket structure incorporating preferred embodiment of the present invention and FIG. 2 shows a detail, in cross-section, for a modification of the structure in FIG. 1.
Figure 1:
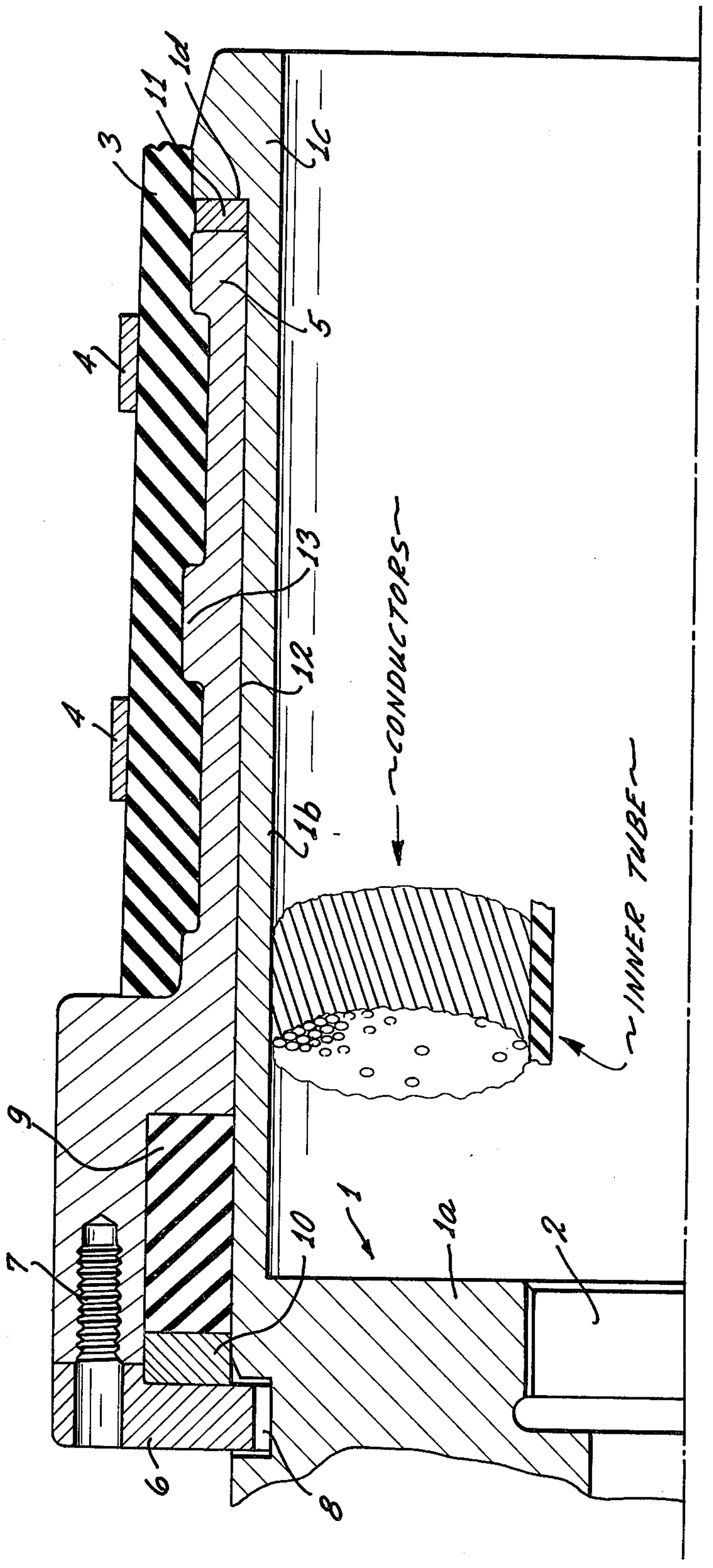

The figure shows particularly a socket member 1 with an annular end or body portion 1*a* from which extends a sleeve 1*b* with an end 1*c* of wider diameter, slight taper in axial direction and abutment shoulder 1*d*.

Member 1 and here particularly socket end 1*a* has a central opening 2 constructed for receiving, e.g. threadedly, the inner tube (not shown) for the cable. More specifically, a water feeder tube may be threaded into bore 2, and the inner cable tube is then in turn fastened to that feeder tube. The conductor's ends occupy the (remaining) space inside of the sleeve 1*b*, and reference numeral 3 refers to the hose which is the outer envelope of the cable and which has been slipped over sleeve 1*b* on the outside thereof. In other words, the sleeve 1*b* is slipped in between the conductors and the outer hose 3.

Hose 3 may be constructed as rubber hose with inserted fiber mesh for reinforcement. The water is contained inside of hose 3. As far as the water feeding device is concerned, reference is made e.g. to U.S. Pat. No. 3,808,350 and to U.S. Pat. (Ser. No. 515,517 filed Oct. 17, 1974 of common assignee). However, the connection of hose 3 to the socket member 1 differs.

Specifically, hose 3 is pivotably mounted on socket member 1 to permit relative turning between these parts on the system axis! Hose 3 is not directly slipped on sleeve 1*b*, but a second to sleeve or sleeve member 5 has been slipped onto sleeve 1*b*, and the two sleeves can turn relative to each other. The hose 3 is slipped over sleeve 5 and fastened thereto by means of straps 4. These straps are preferably antimagnetic. Sleeve 5 is preferably made of metal or any other suitable, particularly strong and heat resisting material. Sleeve 5 is provided with ridges 13 to enhance frictional contact with the hose for establishing better fastening conditions thereof on sleeve 5. Such corrugation like ridges and grooves ensure also permanency of the strapped connection.

The interface 12 between sleeves 5 and 1*b* is either established by smooth surfaces with clearing in between. However, as shown in FIG. 2 a friction lining 12*a* may be interposed and connected to sleeve 5, or sleeve 1*b*, so that one can turn smoothly on the other.

A two part or split flange member 6 is bolted to one axial end of sleeve 5 to retain the position of the latter on socket member 1. Part 1*a* of socket member 1 has a peripheral groove or track 8, into which the flange 6 has been inserted for that retaining function. However, the inserted portion of flange 6 rides freely in the groove 8 as the retention must not impede rotation of sleeve 5 to which flange 6 is firmly bolted (bolts 7).

The flange parts each are semi-annular and slipped onto the socket radially - laterally, from opposite directions for insertion in groove 8 and bolting to sleeve 5. The flange parts could, but do not have to be interconnected themselves; common connection to sleeve 5 suffices.

The connection as between sleeve 5, socket 1 and flange 6 is sealed by means of an annular sealing sleeve 9 whereby a copper washer 10 (or several) exerts axial pressure. upon sleeve 9 to obtain water tight sealing as between sleeves 1*b* and 5. The compression of sealing sleeve 9 will cause strong engagement thereof against parts 5 and 1*b*. However, rotation of part 5 is only insignificantly impeded, particularly if part 9 has smooth surface where interfacing with sleeve 1*b*. It should be noted that compression of sealing sleeve 9 is not taken up by socket 1 as far as axial engagement of 6 and 8 is concerned, as 9 is held between bolted together parts 5 and 6.

It can thus be seen that any movement as between those parts which the cable interconnects (e.g. a transformer and a furnace cover) and resulting in a tendency of hose 3 to turn relative to socket 1, is readily taken up by rotation of sleeve 5 on sleeve 1*b*. Thus, hardly any torsion will be exerted upon the hose 3. The conductors in the cable laid on laidon the inner tube with a twist, so that some further twisting has little effect on them. The inner tube is held by the overlay of the conductors, but could also be fastened to the socket in an analogous manner to undergo rotation on twisting of the cable.

The sleeve 5 does not directly abut shoulder 1*d*, but a bearing ring 11 is interposed. As stated, the sleeve 5 and 1*b* are telescoped with play. Instead, one may interpose a slide bearing like sleeve, or friction lining as was outlined above. Specifically, one may provide one or the other or both sleeve surfaces with slide bearing defining layers. One may shrink, for example, a thin bearing sleeve onto sleeve 1*b*, and sleeve 5 may have a sufficiently smooth, inner surface to slide on that bearing sleeve. One of these interengaging surfaces may be chromium plated for smooth interfacing.

In the alternative, sleeve 5 may be mounted on sleeve 1*b* by means of ball or roller or slide bearings. Essential is that the two sleeves can turn rather freely relative to each other to provide for torsion relief of the outer hose of the liquid cooled cable.

I claim:

1. A connection between (a) a liquid cooled heavy current cable having an inner tube for the coolant, conductors thereon and an outer tube or hose; and (b) a socket member having a sleeve in which are inserted the conductors, and being provided for a connection to the inner tube, the connection between the cable and the socket member comprising an annular member for rotation on the sleeve of the socket member;

means for rotatably mounting the annular member on the sleeve for obtaining relative turning between the sleeve and the annular member; and means for fastening the outer tube or hose to said annular member.

2. A connection as in claim 1, wherein the annular member is a sleeve rotatably seated on the socket sleeve.

3. A connector as in claim 2, and including means for retaining the sleeve member on the socket sleeve and preventing axial displacement.

4. A connection as in claim 3, wherein the retaining means include sealing means.

5. A connection as in claim 3, wherein the means for retaining includes a split flange secured to the sleeve.

6. A connector as in claim 2, wherein the socket sleeve has an abutment surface for axial engagement by the sleeve member, there being a bearing annulus interposed.

7. A connector as in claim 2, wherein the socket sleeve and the sleeve member engage by means of bearing surfaces.

8. A connection as in claim 1, wherein the means for rotatably mounting includes bearing means.

9. A connector as in claim 8, wherein the bearing means is defined by bearing surfaces interposed between the socket sleeve and the sleeve member.

* * * * *